United States Patent [19]

Bryant

[11] 4,456,221

[45] Jun. 26, 1984

[54] TWO PIECE BALL VALVE ASSEMBLY

[76] Inventor: Deolan R. Bryant, 480 W. Sharon Rd., Cincinnati, Ohio 45246

[21] Appl. No.: 329,406

[22] Filed: Dec. 10, 1981

[51] Int. Cl.³ .................... F16L 37/00; F16K 31/44
[52] U.S. Cl. .................................. 251/152; 251/214; 251/266; 251/270; 251/330
[58] Field of Search ............... 251/266, 267, 270, 272, 251/152, 330, 214; 137/315

[56] References Cited

U.S. PATENT DOCUMENTS

| 916,629 | 4/1909 | Throop | 251/87 |
| 921,981 | 5/1909 | Halley | 137/630.18 |
| 930,386 | 8/1909 | Kiefer | 251/152 |
| 1,068,927 | 7/1913 | Pribil | 277/33 |
| 1,326,938 | 1/1920 | Knudsen | 251/266 |
| 1,336,026 | 4/1920 | Dempsey | 251/270 |
| 1,362,986 | 12/1920 | Dunham | 251/219 |
| 1,462,834 | 7/1923 | Stenwall | 277/105 |
| 1,705,404 | 4/1929 | Hedberg | 251/266 |
| 1,720,346 | 7/1929 | Pew | 137/237 |
| 1,773,110 | 8/1930 | Meyers | 251/152 |
| 1,958,988 | 5/1934 | Eisele | 251/48 |
| 2,109,801 | 1/1938 | Parker | 251/330 |
| 2,525,989 | 10/1950 | Works et al. | 251/167 |
| 2,817,545 | 12/1957 | Uhler | 286/11.12 |
| 3,037,521 | 6/1962 | Larry | 251/330 |
| 3,284,089 | 11/1966 | Wrenshall | 277/125 |

FOREIGN PATENT DOCUMENTS 46-23093 7/1971 Japan .................... 251/266

Primary Examiner—A. Michael Chambers
Attorney, Agent, or Firm—Frost & Jacobs

[57] ABSTRACT

A two piece ball valve assembly kit specifically for use with a hollow T or Y pipe joint. The valve includes a valve actuator assembly which can be connected by threads or a flanged connection to the inlet of the joint and which includes a spherical valve element which can be linearly reciprocated by rotating an operating handle. A disjointed seating element having a circular seating surface may be connected to the outlet of the pipe joint by a threaded or a flanged connection in axial alignment with the valve element. The valve element may be reciprocated within the joint against the seating surface to control fluid flow through the joint, with the joint serving as a valve housing. The ball valve also includes sealing members for excluding fluid from the valve housing when the valve is in the fully opened position. The valve assembly includes alternate embodiments usable with T or Y pipe joints.

12 Claims, 6 Drawing Figures

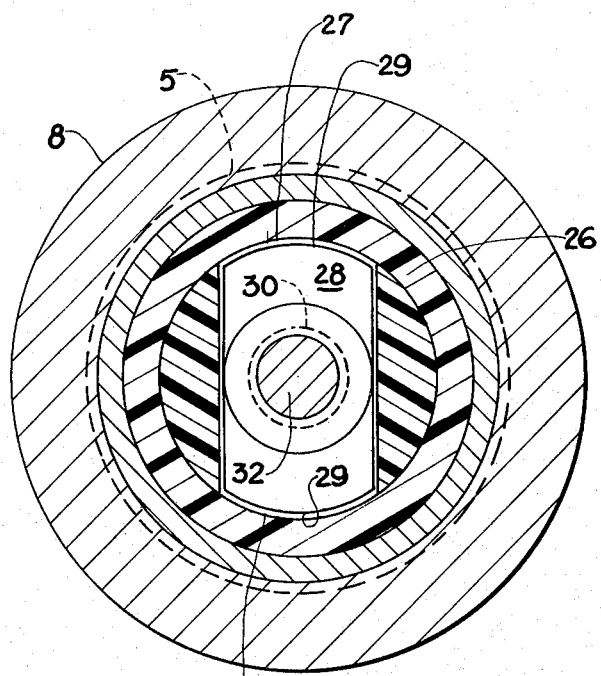
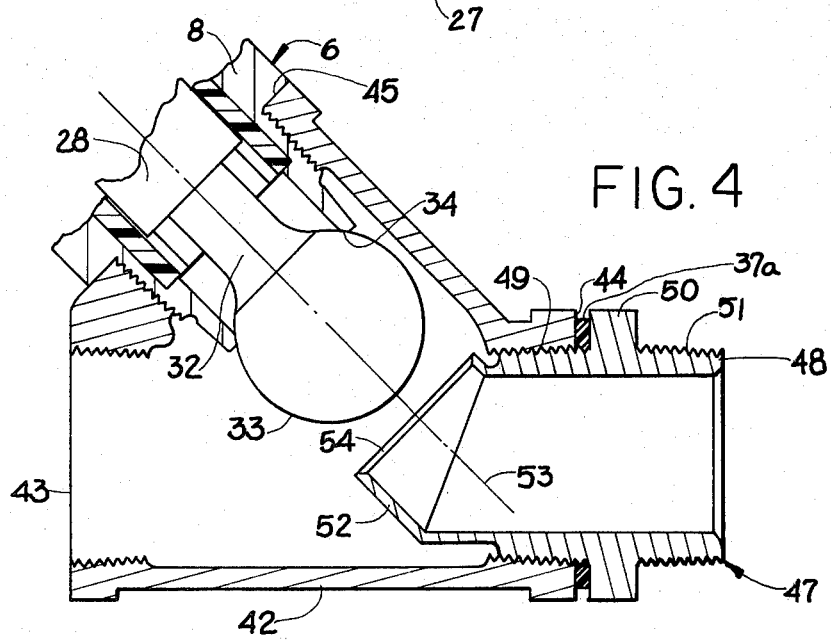

TWO PIECE BALL VALVE ASSEMBLY

SUMMARY OF THE INVENTION

The present invention relates generally to a manually actuable ball valve, and more particularly to a manually actuable ball valve having a linearly movable valve element which is provided with a separate valve seat assembly for attachment to a pipe coupling or joint.

In many instances in fluid handling applications it is necessary to provide a manually operable valve in the line for controlling the fluid flow. Conventionally, such valves are provided as integral one piece units which are merely inserted at the appropriate place in the fluid line by threaded couplings or the like.

The present invention is directed to a manually actuable ball-type valve which is provided in two pieces, a valve actuator assembly and a valve seat assembly, and is intended to be used in association with a standard pipe joint or coupling of the type having an interiorly threaded inlet, an interiorly threaded outlet spaced from the inlet, and an interiorly threaded opening positioned intermediate the inlet and outlet. Alternatively, the invention may be used with flanged-type fittings.

The valve actuator assembly includes a spherical shaped resilient valve element, a hollow valve body, a linear actuator member slidably restrained within the valve body and attached to the valve element with an axially extending threaded bore therein, and a rotatably mounted actuating rod extending longitudinally within the housing, one end of the rod threadedly engaging the bore, the other end of the rod terminating in a manually graspable handle located exteriorly of the housing for operating the valve. Consequently, as the handle is rotated, the spherical shaped valve element reciprocates between an open and closed position.

In the form of the invention having threaded connections, one end of the valve actuator assembly housing is provided with an exteriorly threaded portion for connecting the actuator assembly to the intermediate opening of the pipe joint so that the valve element is reciprocable within the joint. The present invention also includes a separate seat assembly having a generally round seating surface configured to engage the valve element to provide a fluid tight seal therebetween, as well as an exteriorly threaded portion for threadedly connecting the seat assembly to either the inlet or outlet of the joint such that the seating surface lies within the joint in alignment with the ball element so that when the actuator assembly and seat assembly are assembled to the joint the valve element may be linearly reciprocated between a closed position wherein the valve element sealingly engages the seating surface to prevent fluid flow between the joint inlet and outlet, and an opened position wherein the valve element is displaced from the seating surface to permit fluid flow between the joint inlet and outlet.

One end of the seating assembly may also be provided with a threaded or flanged portion at the opposite end for connecting the seating assembly to another pipe coupling.

In one embodiment of the invention, the seat assembly comprises a substantially straight tube-like member which permits use with a T joint. In another embodiment, the seat assembly includes an angularly disposed portion enabling the seating assembly and actuator assembly to be used with a Y joint.

The valve actuator assembly housing is further provided with a generally circular seating surface for forming a fluid tight seal with the valve element when the valve element is urged against this seating surface to exclude the fluid from the interior of the valve housing. The housing further includes a bore in one end of the housing for rotatably passing the rod, a valve seat having an inwardly directed circular seating surface mounted coaxially with the rod at the other end of the bore, and a round plug member non-rotatably mounted coaxially on the rod, the plug member cooperating with the seating surface surrounding the rod bore to form a fluid tight seal for preventing passage of fluid through the housing bore.

The valve element is restrained for reciprocating movement by a pair of diametrically spaced longitudinally extending guides having rounded inner surfaces adhered to the interior of the housing, with the actuator member having longitudinal edge surfaces making sliding seals with these guides.

Further features of the invention will become apparent from the detailed description which follows.

BRIEF DESCRIPTION OF THE DRAWING

FIG. 3 is a cross sectional view taken along section line 3—3 of FIG. 2.

FIG. 4 is a fragmentary partially cross sectioned view of a second embodiment of the two piece ball valve assembly of the present invention in connection with a Y coupling or joint.

DETAILED DESCRIPTION

Figure 1:
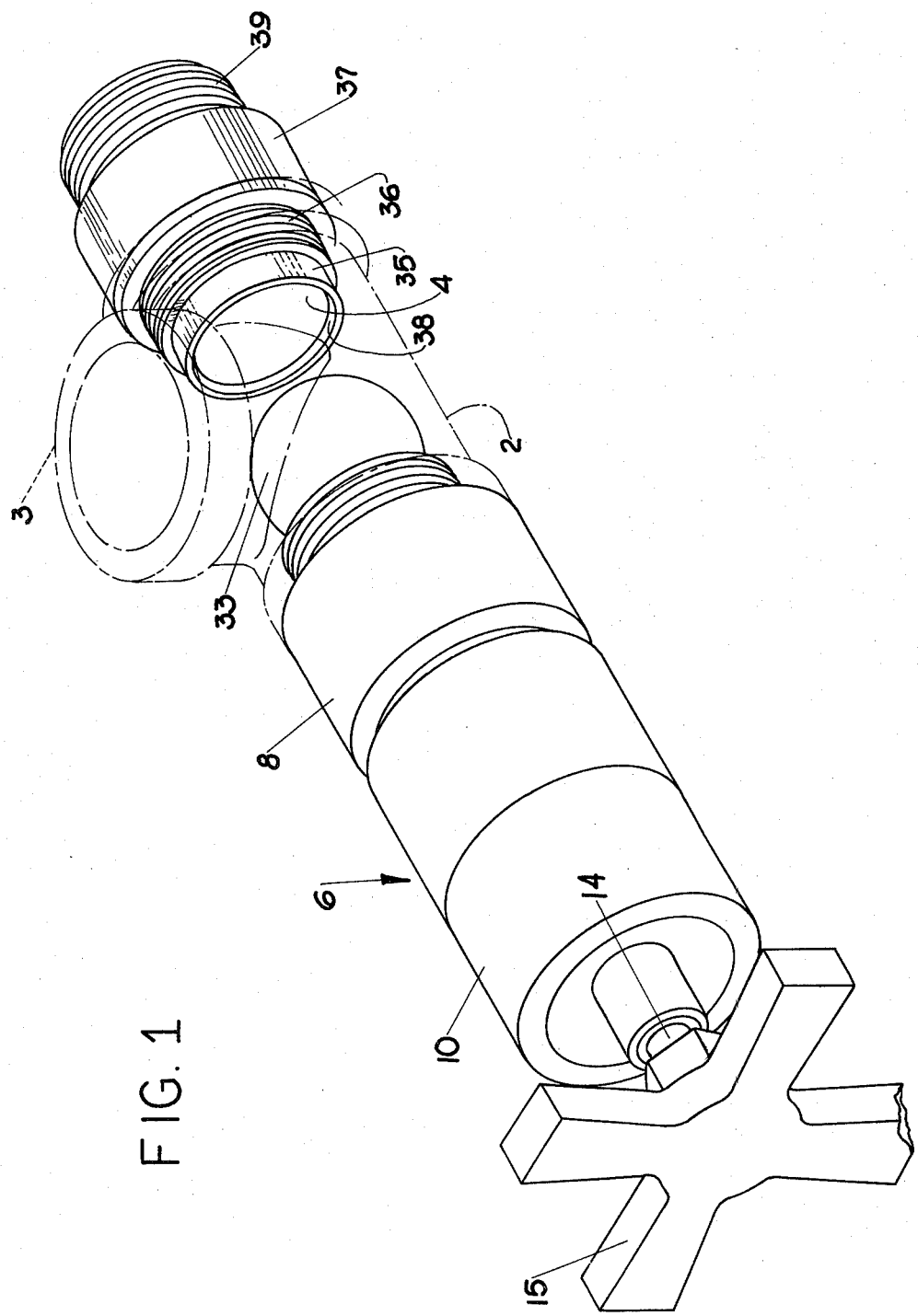
FIG. 1 is a perspective view of the two piece ball valve assembly of the present invention connected to a conventional T joint or coupling.

As noted hereinabove, the present invention enables a ball valve to be assembled utilizing a conventional T or Y coupling or joint as part of the valve housing. In a first embodiment illustrated in FIG. 1-FIG. 3, the ball valve assembly, illustrated generally at 1, is used in connection with a conventional T coupling or joint 2 of the type having an interiorly threaded inlet 3, an interiorly threaded outlet 4 spaced from inlet 2, and an interiorly threaded opening 5 positioned intermediate the inlet and outlet.

Ball valve assembly 1 includes a valve actuator assembly 6 which threadedly engages intermediate opening 5, and a separate seating assembly 7 which is configured to threadedly engage the coupling outlet 4.

Valve actuator assembly 6 includes a generally cylindrical hollow valve body 8 bearing an exteriorly threaded portion 9 at one end for threadedly engaging the interior threads of intermediate opening 5. The opposite end of the valve body is closed by means of an end cap 10 bearing a threaded portion 11 which engages the interiorly threaded portion 12 of valve body 8. End cap 10 includes a longitudinally extending central bore 13. It will be understood that valve body 8 and end cap 10 may be fabricated from any suitable material. A suitable annular sealing gasket 37a may also be positioned between valve body 8 and end cap 10.

An actuating rod 14 of circular cross section passes axially within bore 13 and is dimensioned to provide a close rotatable sealing fit with the bore. The outermost end of rod 14 terminates in a manually graspable handle 15 located exteriorly of housing 8 for operating valve assembly 1.

The inner end of end cap 10 contains a circular counterbore 16 which mounts a circular seat 17 coaxially with actuating rod 14, thereby forming a raised seating surface 18 at its innermost end. A cylindrical plug member 19 is non-rotatably secured to the inner end of actuating rod 14 coaxially therewith and includes a circular tapered bore 20 having inwardly sloping side edges which forms a fluid tight rotating seal with seating surface 18 when plug member 19 is urged thereagainst to prevent passage of fluid through housing bore 13.

Figure 2:
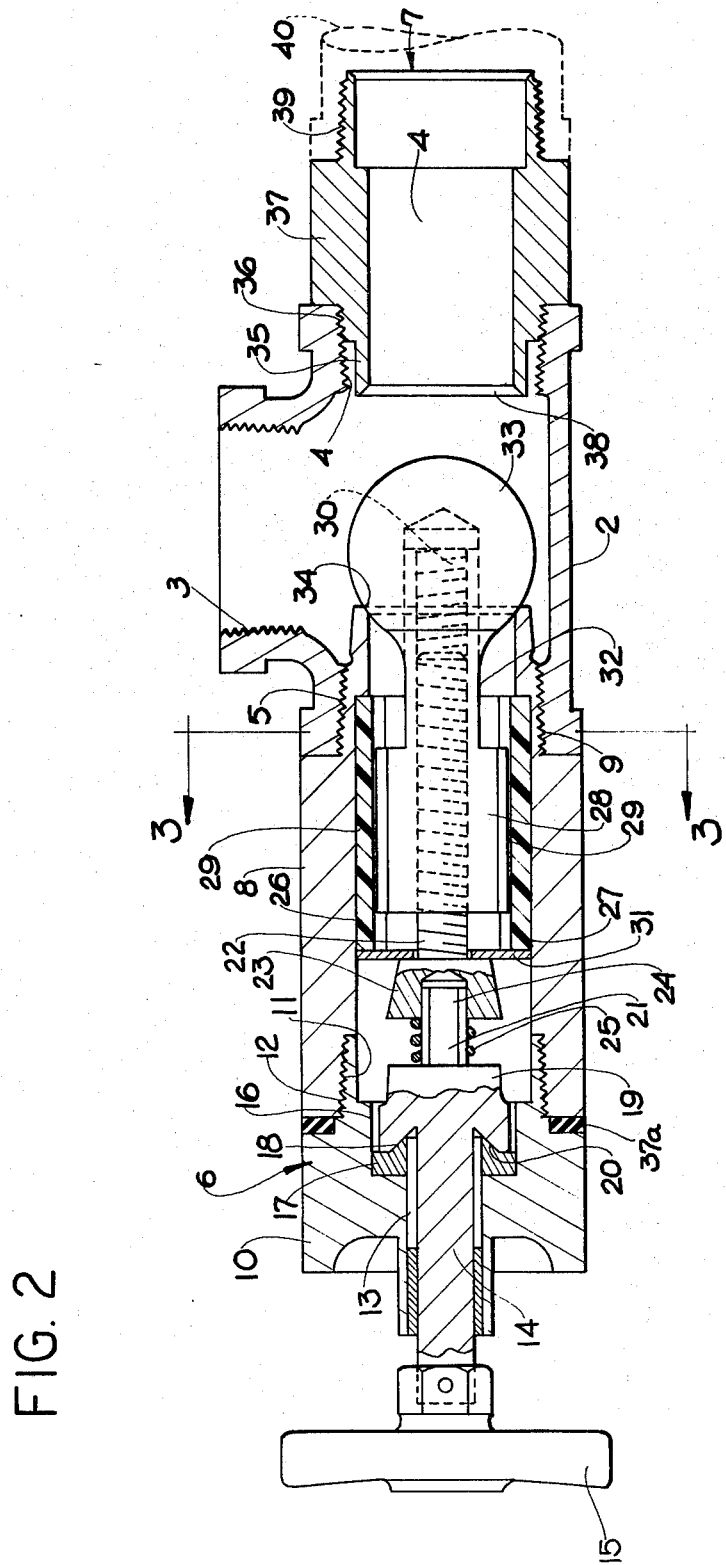
FIG. 2 is a side elevation partially cross sectioned view of the two piece ball valve assembly illustrated in FIG. 1.

The inner end of plug member 20 terminates in a linearly extending rod 21 of hexagonal cross section. A longitudinally extended threaded rod 22 is axially aligned with rod 21 and terminates at its outer end in an enlarged portion 23 of cylindrical shape having a central bore 24 of hexagonal shape for cooperating with the inner end of rod 21. Consequently, rotation of handle 15 in either direction will cause corresponding rotation of rod 21 which will be transmitted to threaded portion 22. At the same time, however, rod 21 may be easily detached from threaded portion 22. As best shown in FIG. 2, a compression spring 25 surrounds rod 21 and cooperates with the corresponding plane surfaces of plug member 19 and enlarged portion 23 to urge these members apart.

Immediately inwardly of enlarged portion 23, the interior surface of housing 8 is provided with a pair of diametrically spaced longitudinally extending guides 26 having generally concave inner surfaces 27. Guides 26 extend from a point just inward of enlarged portion 23, to a point just short of the innermost end of housing 8. If desired, guides 26 may be replaced by a cylindrical sleeve positioned coaxially within housing 8 and provided with appropriate guide surfaces 27.

An elongated block-like linear actuator member 28 of generally rectangular cross section is slidably restrained within valve body 8 and includes convex longitudinally extending side edges 29 (see FIG. 3) which slidingly cooperate with concave surfaces 27 of guides 26. A longitudinally extending threaded bore 30 is provided axially within actuator member 28 and threadedly engages threaded rod 22. An annular thrust washer 31 is positioned coaxially with threaded rod 22 between the inner surface of enlarged portion 23 and the adjacent ends of guides 26 to provide a bearing surface for enlarged portion 23. Washer 31 also restrains enlarged portion 23 against axial movement.

The opposite end of actuator member 28 terminates in a cylindrical rod-like connecting member 32 which is fixedly connected at its outermost extremity to a spherical resilient valve element 33. It will be understood that valve element 33 may be constructed from any suitable material.

The end of valve body 8 adjacent to valve element 33 terminates in a generally circular seating surface 34 which forms a fluid tight seal with the correspondingly shaped surface of valve element 33 when the valve element is urged against this seating surface when the valve is in the fully opened position to exclude fluid from the interior of the valve body.

There is also provided with the ball valve assembly 1 of the present invention a seat assembly, shown generally at 7, which comprises a hollow tubular member 35 having an exteriorly threaded portion 36 at one end for threadedly engaging the coupling outlet 4. An outwardly extending peripheral flange 37 is also provided around the outer surface of tubular member 35 to provide a fluid tight seal with the end surface of coupling 2.

The innermost end of the seat assembly 7 forms a generally circular seating surface 38 which is configured to engage the corresponding surface of valve element 33 to provide a fluid tight seal therebetween. As shown in FIG. 2, when the seat assembly 7 is coupled to the T coupling 2, seating surface 38 lies within the joint in alignment with valve element 33 so that the valve element may be linearly moved between a closed position wherein the valve element sealingly engages seating surface 38 to prevent fluid flow between inlet 3 and outlet 4, and an opened position wherein valve element 33 is displaced from seating surface 38 to permit fluid flow between the joint inlet and outlet. Seat assembly 7 may also be provided with an exteriorly threaded portion 39 at its opposite end for connecting the valve assembly to another pipe coupling or pipe section, illustrated diagrammatically at 40.

In operation, actuator assembly 6 and seat assembly 7 may be provided as part of a "kit" for use with couplings of the type illustrated. The actuator assembly is threaded into intermediate opening 5 of the T coupling, while seat assembly 7 is threaded into the oppositely located outlet 4 of the coupling. Fluid flow between inlet 3 and outlet 4 may them be prevented by turning handle 15 which causes threaded portion 22 to threadedly enter bore 30, thereby moving actuator member 28 linearly to the right as viewed in FIG. 2 to cause valve element 33 to seat against seating surface 38 of seating assembly 7. Conversely, the valve may be opened to permit fluid flow between the inlet and outlet by reversing the direction of rotation of handle 15, thereby causing threaded rod 22 to withdraw from threaded bore 30 and actuating member 28 to move linearly to the left as viewed in FIG. 2 to withdraw the valve element from seating surface 38. In the fully opened position, the surface of the outer surface of valve element 33 is in sealing engagement with seating surface 34 of actuator assembly 6. During both modes of operation, compression spring 25 urges surfaces 18 and 20 to form an additional seal between seat 18 and plug member 19 to further prevent escape of fluid.

In an alternate embodiment, means may also be provided for utilizing the ball valve assembly 1 of the present invention with a Y connector such as joint 42 illustrated in FIG. 4. In this embodiment, elements corresponding to those previously described have been similarly designated. As is well known in the art, Y coupling 42 includes a threaded inlet 43, a threaded outlet 44, and an interiorly threaded intermediate opening 45. In the embodiment shown, actuator assembly 6 is threadedly mounted in intermediate opening 45 so that valve element 33 extends within the hollow coupling 42.

Similarly, a seat assembly 47 is mounted to threaded outlet 44. As illustrated in FIG. 4, seat assembly 47 comprises a generally tubular body portion 48 having one end threaded as at 49 for engaging the interior threads of outlet 44. A peripherally extending flange 50 may be provided outwardly of threaded portion 49 for providing a fluid tight seal against the outer end of the flange associated with outlet 44. Furthermore, the opposite end of body portion 48 may be threaded as at 51 for connecting the valve assembly to another coupling or threaded pipe, not shown in a manner similar to that described hereinabove.

The inner end of body portion 48 is provided with a generally tubular angularly disposed section 52 having a central axis 53 in alignment with the central axis of valve element 33 when actuator assembly 6 and seat assembly 47 are assembled to the Y joint. The inner end of section 52 is provided with a circular seating surface 54 which cooperates with the outer surface of valve element 33 to provide a fluid tight seal when the valve is closed in a manner to that described in connection with the embodiment of FIG. 1-FIG. 3. In all other respects, the operation of the valve assembly is the same as that previously described.

Figure 5:
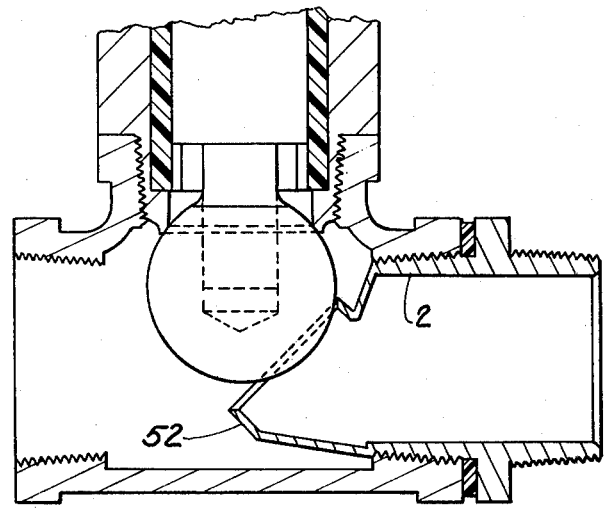
FIG. 5 is a fragmentary partially cross sectioned view of a third embodiment of the two piece ball valve assembly of the present invention in connection with a T coupling or joint having an angularly disposed seat.

A further embodiment of the present invention is illustrated in FIG. 5 where the present invention is utilized with a T coupling or joint 2 of the type generally illustrated in FIG. 2, but having included therein a generally tubular angularly disposed section 52 of the type illustrated in FIG. 4 in connection with the Y-type coupling. In all other respects, this embodiment is threadedly coupled to the surrounding sections and operates substantially as described hereinabove.

Figure 6:
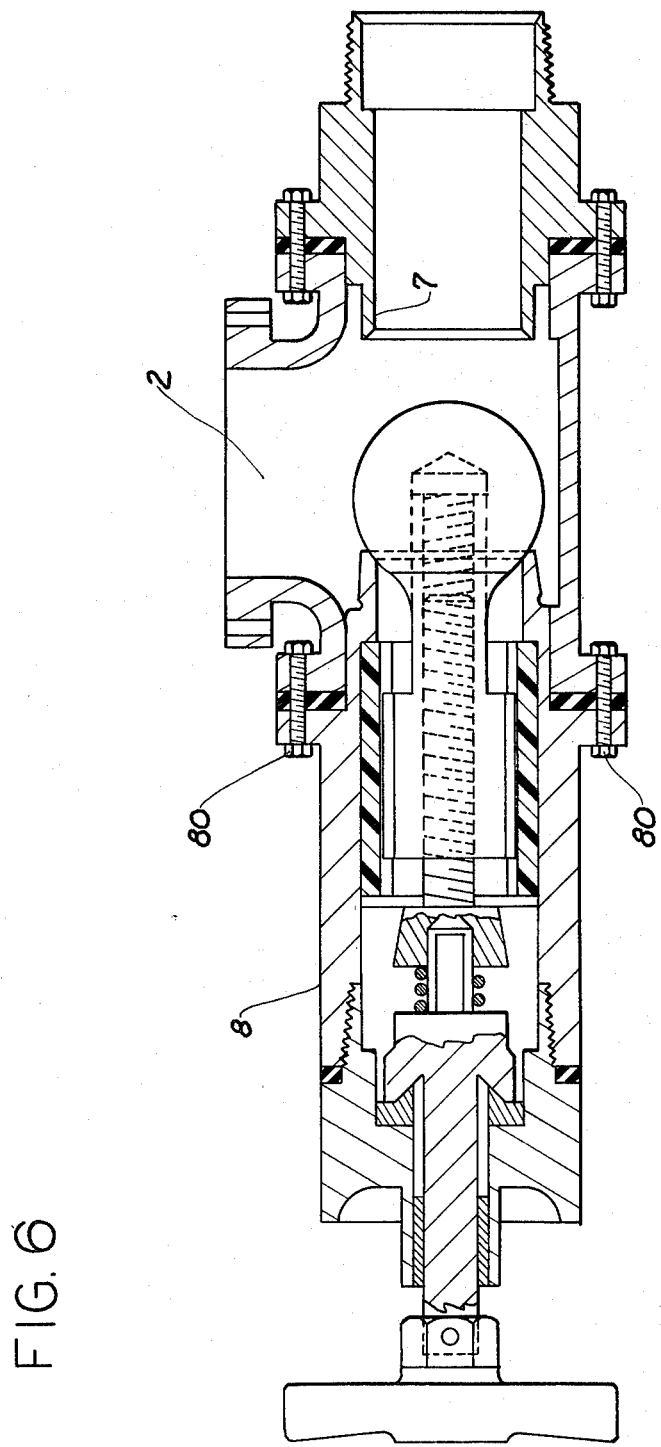
FIG. 6 is a side elevation partially cross sectioned view of a two piece ball valve assembly having flange-type connections.

FIG. 6 illustrates a form of the present invention utilizing flange-type couplings. In this embodiment, instead of the threaded couplings previously described, valve housing 8, seat assembly 7, and the T coupling 2 are provided with outwardly extending annular flanges which may be secured together by fastening means such as nuts and bolts 80, or the like as is well known in the art. In all other respects, the construction and operation is the same as that described hereinabove.

It will be understood that various changes in the details, materials, steps and arrangements of parts, which have been herein described and illustrated in order to explain the nature of the invention may be made by those skilled in the art within the principle and scope of the invention as expressed in the appended claims.

The embodiments of the invention which an exclusive property or privilege is claimed are as follows:

1. A ball valve assembly kit adapted to be coupled with a hollow pipe joint of the type having an inlet, an outlet spaced from said inlet, and an opening positioned intermediate said inlet and outlet, said valve assembly kit comprising:
   a valve actuator assembly having a spherical shaped valve element, means for linearly reciprocating said valve element and means capable of coupling said actuator assembly to the pipe joint such that when said valve actuator is coupled to a pipe joint, said valve element is reciprocable within the pipe joint; and
   a seat assembly having a generally round seating surface configured to engage said valve element to provide a fluid tight seal therebetween and means capable of coupling said seat assembly to the pipe joint such that said seating surface lies within the joint in alignment with the valve element so that when the valve actuator assembly and seat assembly are assembled to the joint, said valve element may be linearly moved by said reciprocating means between a closed position wherein the valve elements sealingly engages the seating surface to prevent fluid flow between the joint inlet and outlet, and an opened position wherein said valve element is displaced from the seating surface to permit fluid flow between the pipe joint inlet and outlet, wherein said seat assembly includes means adapted to extend outside of said pipe joint for connecting the seat assembly to a second pipe, coupling or the like, said linear reciprocating means including
   a hollow valve body;
   a cap means closing one end of said valve body;
   a linear actuator member slidably restrained within said valve body and attached to said valve element, said linear actuator member bearing an axially extending bore; and
   a rotatably mounted actuating rod extending longitudinally within said cap means, one end of said rod engaging said bore, the other end of said rod terminating in a manually graspable handle located exteriorly of said cap means for operating said valve, and wherein said rod includes a coaxial plug, said plug having an outwardly directed circular recess member, said cap includes a central opening through which said actuating rod extends, said central opening including an inwardly directed circular seating surface projection which mates with said outwardly directed circular recess member to prevent passage of fluid around said rod and through said cap.

2. The apparatus according to claim 1 wherein said seat assembly comprises a substantially straight tube-like member for use with a T joint.

3. The apparatus according to claim 1 wherein said seat assembly includes an angularly disposed portion mounting said seating surface for use with a Y joint.

4. The apparatus according to claim 1 including a pair of diametrically spaced longitudinally extending guides having rounded inner surfaces within the interior of the valve body, said inner actuator member having longitudinal edge surface forming sliding seals with said guides.

5. The apparatus according to claim 4 including spring means urging both said rod and said bore apart along their respective longitudinal axis.

6. The apparatus according to claim 1 including spring means urging both said rod and said bore apart along their longitudinal axes.

7. The appratus according to claim 6 wherein said valve actuator assembly and said seat assembly are provided as disjointed parts.

8. The apparatus according to claim 1, wherein said linear actuator member bearing said bore includes an enlarged portion within which said bore is formed.

9. The apparatus according to claim 1, wherein said one end of said rod engaging said bore is hexagonally shaped.

10. A ball valve assembly kit for converting a T or Y pipe joint to a valve comprising a valve actuator assembly having a hollow valve body, a spherical shaped valve element, a linear actuator member slidably restrained within said valve body and attached to said valve element, said linear actuator member bearing an axially extending bore, a cap means for closing one end of said hollow valve body, a rotatably mounted actuating rod extending longitudinally within said cap means, one end of said rod engaging said bore, the other end of said rod terminating in a manually graspable handle located exteriorly of said cap means for operating said valve, a pair of diametrically spaced longitudinally extending guides having rounded inner surfaces within the interior of the valve body, said linear actuator member having longitudinal edge surfaces forming sliding seals with said guides, a seat assembly having a generally rounded seating surface configured to engage said valve element to provide a fluid tight seal therebetween, said seat assembly being arranged such that the valve element may be linearly moved between a closed position wherein the valve element sealingly engages the seating surface to prevent fluid flow, and an opened position wherein said valve element is displaced from the seating surface to permit fluid flow, and wherein said rod includes a coaxial plug, said plug having an outwardly directed circular recess member; said cap includes a central opening through which said actuating rod extends, said central opening including an inwardly directed circular seating surface projection which mates with said outwardly directed circular recess member to prevent passage of fluid around said rod and through said cap.

11. The apparatus according to claim 10, wherein said seat assembly comprises a substantially straight tube-like member for use with said T pipe joint.

12. The apparatus according to claim 10, wherein said seat assembly includes an angularly disposed portion mounting said seating surface for use with a Y pipe joint.

* * * * *